AMPLIFIER WITH FEEDBACK PARTICULARLY USEFUL WITH A GRAVITY WAVE DETECTOR
Filed Oct. 25, 1967

INVENTOR
JOSEPH WEBER

BY Hurvitz, Rose & Greene
ATTORNEYS

United States Patent Office 3,554,033

Patented Jan. 12, 1971

3,554,033

AMPLIFIER WITH FEEDBACK PARTICULARLY USEFUL WITH A GRAVITY WAVE DETECTOR

Joseph Weber, Chevy Chase, Md., assignor of one-half to Hyman Hurvitz, Washington, D.C.

Filed Oct. 25, 1967, Ser. No. 678,003

Int. Cl. G01v *7/04;* H03f *1/34*

U.S. Cl. 73—382 18 Claims

ABSTRACT OF THE DISCLOSURE

An amplifier particularly for use with a piezoelectric transducer bonded to a vibrating mass. The crystal is connected in the input circuit of the amplifier, and the mass and crystal are equivalently represented by a series tuned circuit, at resonance. A feedback path of high resistance is provided in the amplifier, and feedback is negative, so that the feedback resistance and the amplifier input impedance represent a voltage divider. For high input impedance large negative feedback occurs, while for low input impedance small negative feedback occurs, due to the action of the divider. The effective Q of the series tuned circuit is thus increased. The output circuit of the amplifier may be, if desired, a low Q tank circuit. If $r_2$ is the feedback resistance and $r$ the effective resistance of the series tuned circuit gain can be $$\frac{r_2}{r}$$

at resonance.

BACKGROUND OF THE INVENTION

The gravitational wave detector now operating at the University of Maryland comprises an aluminum cylinder. An incident gravitational wave would be expected to set up vibrations in this cylinder. Piezoelectric crystals are bonded to the cylinder to convert the vibrational energy to electrical form.

The cylinder may be represented by a series LC$r$ circuit, driven by a voltage V, in which inductance L is the electromechanical equivalent of the mass of the cylinder, capacitance C is the electromechanical equivalent of the stiffness of the cylinder, $r$ the loss equivalent and V is proportional to the gradient of the gravitational field. Each crystal has an effective interelectrode capacitance $C_0$ which is resonated with an external parallel inductance $L_1$, so that the capacitance $C_0$ and its inductance $L_1$ present a high impedance tank circuit at the resonant frequency.

The voltage V must be greater than $\sqrt{4KTr\Delta\nu}$, where K is Boltzmann's constant, T is absolute temperature and $\Delta\nu$ is bandwidth. A resistance $r_1$ shunts the tank, which then has a Q of about 100. The acoustic mode of the cylinder has a Q of about 77,000. The circuit $L_1$, $C_0$, $r_1$, because of its bandwidth, contributes noise greatly exceeding that of the small resistance $r$.

According to the invention, the series resonant circuit L$cr$ is connected in the input circuit of an amplifier, and negative feedback provided via a high resistance $r_2$. Gain of the amplifier will be high at resonance, which is characterized by low resistance $r$ across the input of the amplifier. For frequencies off resonance the input circuit sees a high impedance, and gain is low, i.e., gain $$g=\frac{r_2}{r_1}$$

for most of the wide band, but $$\frac{r_2}{r}$$

at series resonance.

The gravitational wave detector referred to above is described in my prior application for U.S. patent, Ser. No. 399,632, filed Sept. 28, 1964 (initially field with Zipoy and Forward as coinventors; later amended with J. Weber as sole inventor).

DESCRIPTION OF THE PREFERRED EMBODIMENT

Figure 1:
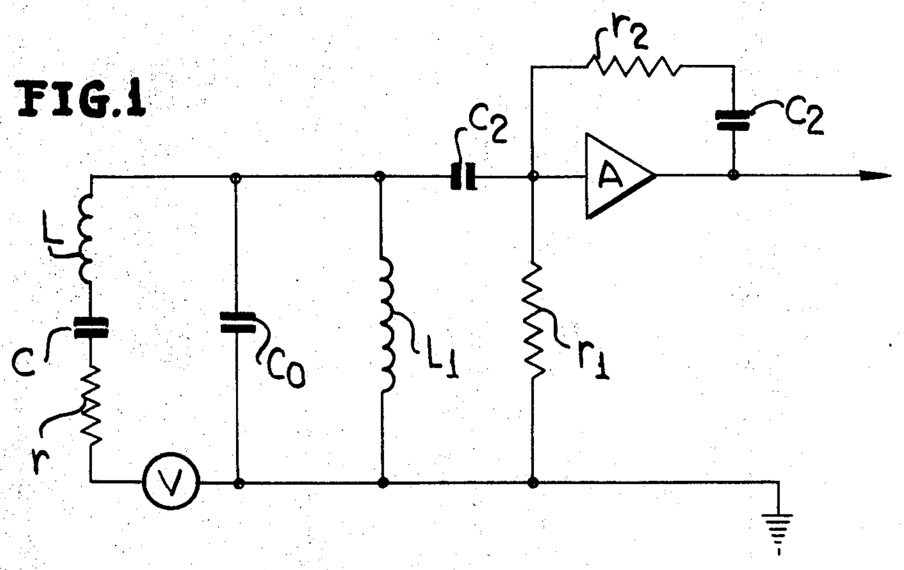
FIG. 1 is a schematic circuit diagram of a first embodiment of the invention.

In FIG. 1, L, C, $r$ represent a series tuned circuit, driven by a voltage V. Across the series tuned circuit is connected a relatively low capacitance $C_0$. The circuit L, C, $r$, is the equivalent circuit of a resonant mechanical device (an elongated aluminum rod) in one embodiment of my invention, and $C_0$ the interelectrode capacity of a piezoelectric strain gauge cemented thereto. The equivalent circuit will be recognized as the same as that of a vibrating piezoelectric crystal, per se, and the output of such a crystal may be detected by the present system, whether or not cemented to a rod. An inductance $L_1$ shunts capacitor $C_0$, and together $L_1C_0$ represent a tank circuit tuned to the frequency $\nu$ of the series resonant circuit. Thereby, the shunting effect of $C_0$ is avoided. Across $L_1C_0$ is connected a resistance $r_1$, which establishes the Q of $L_1C_0r_1$ at about 100. The Q of LC$r$ is about 77,000.

One end of $r_1$ is grounded and the other end connected to the input of an operational amplifier A having a negative feedback loop composed of capacitor $C_2$ and a large resistance $r_2$. $C_2$ is used for blocking DC. At resonance the output of the amplifier proceeds via $r_2$, $r$ to ground. $r_2$ may have a value of 500 K. and $r$ of 4 K., $r_2$, $r$, acting as a voltage divider, thus apply a small feedback voltage to amplifier A, and gain is therefore large, essentially $$\frac{500}{4}$$

However, at frequencies off resonance LC$r$ has a high impedance, and $L_1C_0r_1$ is the smallest impedance across the input of amplifier A. $r_1$=300 K., so that gain reduces to $$\frac{500}{300}$$

The net effect is to reduce the bandwidth for which the system has high gain essentially to the frequency for which LC$r$ is resonant. Since $L_1C_0$ is broad band, the resonance frequency may vary over a considerable range without affecting operation.

Figure 2:
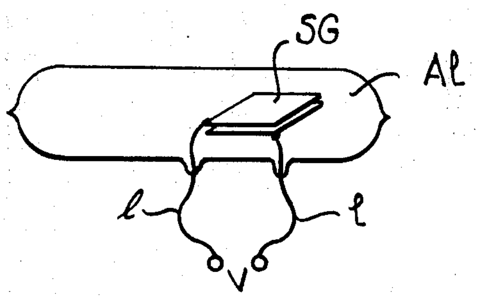
FIG. 2 is a view in perspective of a gravitational wave detector.

In FIG. 2 is illustrated an aluminum cylinder A*l*, having an exemplary length of 5 feet and a diameter of 8 inches, supported at its center, to which is cemented a piezoelectric strain gauge SG having electrodes to which are secured leads l, across which appears a voltage V when rod A*l* vibrates in response to gravitational waves.

Mathematical analysis shows that the feedback network reduces tube noise outside of the narrow band of the transducer. Thus the arrangement gives high gain only near the transducer resonance and discriminates strongly against both circuit and tube noise outside of that range. If the transducer resonant frequency changes due to temperature or other reasons the described action automatically follows as long as the change is within the relatively wide bandwidth of the much lower Q circuits, $L_1$, $C_0$.

Figure 3:
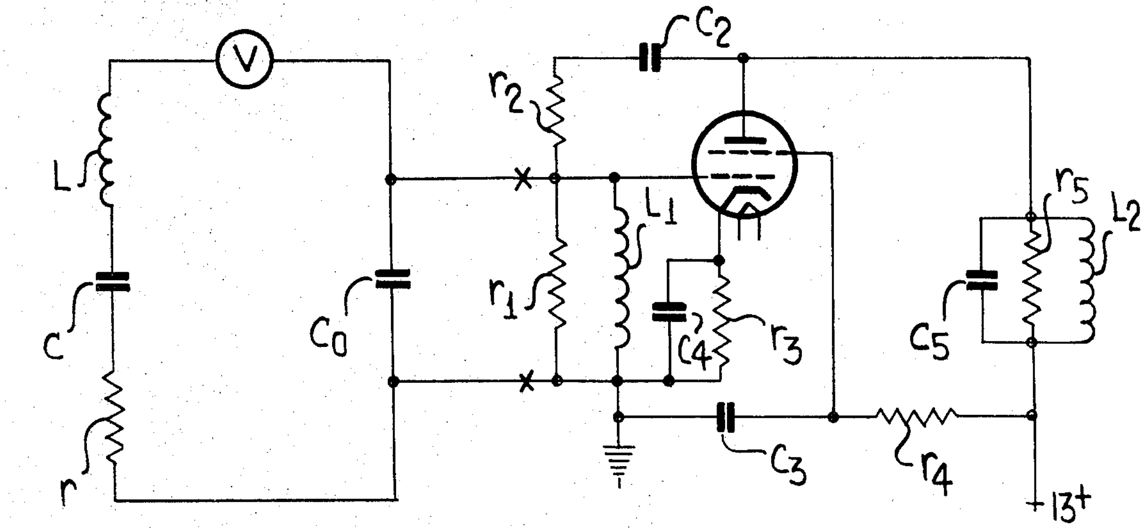
FIG. 3 is a schematic circuit diagram of a second embodiment of the invention.

The system of FIG. 3 is essentially that of FIG. 1, except that in FIG. 3 a broad band tank circuit composed of capacitance $C_5$, inductance $L_2$ and damping resistance $r_5$ is used as the anode load circuit of vacuum tube T, which is the amplifier element of the system. Circuit elements have values as follows:

$r$=4,000 ohms
L=30,800 mechanical equivalent electrical henries
C=0.326 micromicrofarad (equivalent capacity)
$C_0$=.033 micrafarad
$L_1$=0.303 henry
$r_1$=300,000 ohms
$r_2$=500,000 ohms
$C_2$=0.1 microfarad
$r_3$=50 ohms
$r_5$=500,000 ohms
$C_5$=.005 microfarad
$L_2$=2 henries
$r_4$=30,000 ohms
$C_3$=2 microfarads
$B_+$=50 volts.
$C_4$=50 microfarads
The vacuum tube is an RCA Nuvistor Type 7587.

While I have described and illustrated one specific embodiment of my invention, it will be clear that variations of the details of construction which are specifically illustrated and described may be resorted to without departing from the true spirit and scope of the invention as defined in the appended claims.

What is claimed is:

1. A system for detecting gravity waves, comprising an elongated metallic bar,
a piezoelectric crystal having electrodes, the crystal being cemented to said bar at a location which vibrates acoustically in response to said gravity waves,
an amplifier having input terminals connected to said electrodes, said amplifier having an output terminal and also including a negative feedback network extending from said output terminal to said input terminals and having an impedance large by a factor of at least three with respect to the series impedance of said piezoelectric crystal at the resonant frequency of said bar.

2. An amplifier, said amplifier including input terminals and an output terminal, a high Q series resonant circuit connected between said input terminals, and a negative feedback network connected between said output terminal and said input terminals, said negative feedback network having a high impedance by a factor of at least three relative to the equivalent series resistance of said high Q series resonant circuit at the resonant frequency of said series resonant circuit, but of low impedance in comparison with the impedance of said high Q series resonant circuit at frequencies substantially displaced from the resonant frequency of said series resonant circuit.

3. The combination according to claim 2, wherein the impedance of said negative feedback network is about 100 times said equivalent resistance at the resonant frequency of said series resonant circuit.

4. A Q multiplier, including an amplifier having high gain, said amplifier having an input and an output terminal, a high resistance connecting said terminals, a series resonant circuit connected between said input circuit and ground, and a source of signal connected in series with said series resonant circuit, said high resistance being at least three times the equivalent resistance of said series resonant circuit at the resonant frequency of said series resonant circuit, the Q if said series resonant circuit being at least 10.

5. The system according to claim 1 further including a parallel resonant circuit connected across said electrodes and having substantially the same resonant frequency as that of said bar but having a smaller Q than said series resonant circuit by at least one order of magnitude.

6. The system according to claim 1 further including a parallel resonant circuit connected to the output terminal of said amplifier, said parallel resonant circuit having the same resonant frequency as said bar and a lower Q than said series resonant circuit by at least one order of magnitude.

7. The combination according to claim 2 further including a parallel resonant circuit connected between said input terminals, said parallel resonant circuit having substantially the same resonant frequency as said series resonant circuit and a Q which is lower than the Q of said series resonant circuit by at least an order of magnitude.

8. The combination according to claim 2 further including a parallel resonant circuit connected to said output terminal, said parallel resonant circuit having subsubstantially the same resonant frequency as said series resonant circuit and a Q which is lower than the Q of said series resonant circuit by at least an order of magnitude.

9. A system for detecting gravity waves, comprising:
a member capable of vibration in response to said gravity waves, said member having a resonant frequency of vibration;
transducer means secured to said member and having a pair of electrodes for prividing across said pair of electrodes an electrical signal which oscillates at the vibration frequency of said member, said transducer means and said member providing across said pair of electrodes an equivalent series resonant circuit having a Q of at least 1,000 and having minimum series impedance at said resonant frequency of said member and a higher series impedance at other frequencies;
an amplifier having a pair of input terminals connected to said pair of electrodes, an output terminal, and a negative feedback path connected between said output terminal and at least one of said input terminals, said negative feedback path having an impedance which exceeds said minimum impedance by at least a factor of three.

10. The system according to claim 9 wherein the impedance of said negative feedback path is exceeded by the impedance of said series resonant circuit at frequencies other than said resonant frequency of said member, the excess being substantially greater than a factor of three.

11. The system according to claim 9 wherein said transducer means comprises a piezoelectric crystal.

12. The system according to claim 11 wherein said member is an elongated metal cylinder.

13. The system according to claim 12 wherein said elongated metal cylinder is aluminum.

14. The system according to claim 9 further including a parallel resonant circuit connected across said pair of electrodes and having substantially the same resonant frequency as that of said member but having a smaller Q than said series resonant circuit.

15. The system according to claim 14 wherein the Q of said series resonant circuit exceeds that of said parallel resonant circuit by a factor of at least 100.

16. The system according to claim 9 further including a parallel resonant circuit connected to the output terminal of said amplifier, said parallel resonant circuit having the same resonant frequency as said member and a substantially lower Q than said series resonant circuit.

17. A Q multiplier circuit, comprising:
a high gain amplifier having an input terminal and an output terminal, and an AC ground terminal common to said input and output terminals;
a parallel resonant circuit having a predetermined resonant frequency and a specified Q;
means for connecting said parallel resonant circuit between said input terminal and ground;
a series resonant circuit having said predetermined resonant frequency and a Q which is greater than said specified Q by a factor of at least 100;

a signal source for providing alternating signals in a frequency range which includes said predetermined sonant frequency;

means for connecting said series resonant circuit and said signal source in series between said input terminal and ground; and a negative feedback path connected between said output terminal and said input terminal, said negative feedback path having a resistance which exceeds the impedance of said series resonant circuit at said resonance frequency by a factor of at least one hundred but it exceeded by the impedance of said series resonant circuit by a large factor at frequencies off resonance.

18. A Q multiplier circuit, comprising:

a high gain amplifier having an input terminal and an output terminal and a ground terminal, common to said input and output terminals;

a parallel resonant circuit having a predetermined resonant frequency and a specified Q;

a source of bias voltage for said amplifier;

means for connecting said parallel resonant circuit in series with said output terminal and said source of bias voltage;

a series resonant circuit having said predetermined resonant frequency and a Q which is greater than said specified Q;

a signal source for providing alternating signals in a frequency range including said predetermined resonant frequency;

means for connecting said series resonant circuit and said signal source in series between said input terminal and ground; and a negative feedback path connected between said output terminal and said input terminal and having a resistance which exceeds the impedance of said series resonant circuit by a factor of at least three at said predetermined resonant frequency and having a Q of several thousand.

References Cited

UNITED STATES PATENTS

| | | | |
|---|---|---|---|
| 2,613,320 | 10/1952 | Panetta | 331—164X |
| 2,675,432 | 4/1954 | Pan | 330—109X |
| 3,407,360 | 10/1968 | Buhr | 330—31X |
| 3,421,109 | 1/1969 | Wiggins et al. | 330—31X |

JAMES J. GILL, Primary Examiner

U.S. Cl. X.R.

330—28, 109